United States Patent
Huber et al.

(10) Patent No.: US 9,196,053 B1
(45) Date of Patent: Nov. 24, 2015

(54) MOTION-SEEDED OBJECT BASED ATTENTION FOR DYNAMIC VISUAL IMAGERY

(71) Applicant: HRL Laboratories, LLC, Malibu, CA (US)

(72) Inventors: David J. Huber, Calabasas, CA (US); Deepak Khosla, Camarillo, CA (US); Kyungnam Kim, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 577 days.

(21) Appl. No.: 13/669,269

(22) Filed: Nov. 5, 2012

Related U.S. Application Data

(63) Continuation-in-part of application No. 12/214,259, filed on Jun. 16, 2008, now Pat. No. 8,363,939, which is a continuation-in-part of application No. 11/973,161, filed on Oct. 4, 2007, now Pat. No. 8,165,407.

(60) Provisional application No. 61/589,781, filed on Jan. 23, 2012.

(51) Int. Cl.
G06K 9/00 (2006.01)
G06T 7/20 (2006.01)

(52) U.S. Cl.
CPC .............. G06T 7/2006 (2013.01); G06T 7/2033 (2013.01); G06T 2207/20141 (2013.01); G06T 2207/20144 (2013.01)

(58) Field of Classification Search
None
See application file for complete search history.

(56) References Cited

U.S. PATENT DOCUMENTS

| 5,940,538 | A | * | 8/1999 | Spiegel et al. | 382/236 |
| 6,670,963 | B2 | | 12/2003 | Osberger | |
| 2005/0047647 | A1 | | 3/2005 | Rutishauser et al. | |
| 2007/0173699 | A1 | | 7/2007 | Mathan et al. | |
| 2007/0236488 | A1 | | 10/2007 | Mathan et al. | |
| 2008/0031526 | A1 | * | 2/2008 | Bushell et al. | 382/224 |
| 2008/0056611 | A1 | | 3/2008 | Mathan et al. | |
| 2008/0187219 | A1 | * | 8/2008 | Chen et al. | 382/173 |

FOREIGN PATENT DOCUMENTS

WO       WO03093947       11/2003

OTHER PUBLICATIONS

Kim et al. (2005) "Real-time foreground-background segmentation using codebook model." Real-Time Imaging, vol. 11 pp. 172-185.*

(Continued)

*Primary Examiner* — Barry Drennan
(74) *Attorney, Agent, or Firm* — Tope-McKay & Associates

(57) ABSTRACT

Described is a system for object detection from dynamic visual imagery. Video imagery is received as input, and the system processes each frame to detect a motion region exhibiting unexpected motion representing a moving object. Object-based feature extraction is applied to each frame containing a detection motion region. Each frame is then divided into feature-consistent regions. A motion seeded region (MSR) is identified in each frame containing a detected motion region, where the MSR corresponds to a spatial location of the detected motion region. Similar feature-consistent regions that are adjacent to and include the MSR are joined to compute a boundary around the plurality of similar feature-consistent regions. Finally, the system outputs a computed boundary surrounding an object in the detected motion region.

18 Claims, 7 Drawing Sheets

(56) References Cited

OTHER PUBLICATIONS

Huber et al. (2010) "A bio-inspired method and system for visual object-based attention and segmentation." Proc. SPIE vol. 7696, Article 13.*
Andoni A., et al., "Near-Optimal Hashing Algorithms for Near Neighbor Problem in High Dimensions," Proceedings of the Symposium on Foundations of Computer Science (FOCS'06), 2006.
Bentin, S., et al., "Electrophysiological studies of face perception in humans," Journal of Cognitive Neuroscience, 8, 551-565, 1996.
Berg A., "Shape matching and object recognition," Ph.D. thesis, UC Berkeley, Computer Science Division, Berkeley, CA, Dec. 2005.
Berks, C., et al., "Evaluation of an EEG-workload model in an aegis simulation environment" in Proceedings of SPIE Defense and Security Symposium, 90-99, 2005.
Bhattacharyya, R., et al., "Optimal image ordering for rapid serial visual presentation using electroencephalography," Presented at Society of NeuroScience (SfN) annual meeting, Chicago, 2009.
Carpenter G.A., et al., "A massively parallel architecture for a self-organizing neural pattern recognition machine," Computer Vision, Graphics, and Image Processing, 37, 54-115, 1987.
Carpenter G.A., et al., "The what-and-where filter a spatial mapping neural network for object recognition and image understanding," Computer Vision and Image Understanding, 69, 1-22, 1998.
Carpenter G.A., "Default ARTMAP," in Proc. of the International Joint Conference on Neural Networks (IJCNN'03), 1396-1401, 2003.
Carpenter G.A., et al., "Self-organizing information fusion and hierarchical knowledge discovery: a new framework using ARTMAP neural networks," Neural Networks, 16, 267-295, 2005.
Cowell, et al., "Construction and validation of neurophysio-technological framework for imagery analysis," in J.Jacke (Ed.): Human-Computer Interaction, Part II, HCII 2007, LNCS 4551, pp. 1096-1105, 2007, ©Springer-Verlag Berlin Heidelberg.
Draper B., et al., "Evaluation of Selective Attention under Similarity Transforms," In Workshop on Performance and Attention in Computer Vision. Graz, Austria, Apr. 2003.
Eckhorn R., et al., "Coherent Oscillations: A Mechanism of feature linking in the visual cortex?" Biological Cybernetics 60, 121-130, 1988.
Eimer, M., "Does the face-specific N170 component reflect the activity of a specialized eye processor?" Neuroreport, 9, 2954-2948, 1996.
Fabre-Thorpe, M., et al., "A limit to the speed of processing in Ultra-Rapid visual categorization of novel natural scenes," Journal of Cognitive Neuroscience, 13, 171-180, 2001.
Field D.J., "Relations between the statistics of natural images and the response properties of cortical cells," J. Opt. Soc. Am. A., 4: 2379-2394, 1967.
Fei-Fei L., et al., "Learning generative visual models from few training examples: an incremental Bayesian approach tested on 101 object categories," CVPR 2004, Workshop on Generative-Model Based Vision, 2004.
Gerson, A.D., et al., "Cortically coupled computer vision for rapid image search," IEEE Transactions on Neural Systems and Rehabilitation Engineering, 14(2): 174-179, Jun. 2006.
Gladwell, M., "Blink: the power of thinking without thinking," 1st ed. Little, brown and company: Time Warner Book Group, New York, 2005, pp. 18-47.
Gutin, G., et al., "Traveling salesman should not be greedy: domination of analysis of greedy-type heuristics for the TSP," Discrete Applied Mathematics, 117, 81-86, 2002.
Gray C.M., et al., "Oscillatory Responses in Cat visual cortex exhibit intercolumnar synchronization which reflects global stimulus properties," Nature 38:334-336, 1989.
Hopf, J.M., et al., "Localizing visual discrimination processes in time and space," The American Physiological Society, 88, 2088-2095, 2002.
Itti L., et al., "A saliency-based search mechanism for overt and covert shifts of visual attention," Vision Research, 40: 1489-1506, 2000.
Itti L., et al., "A Model of Saliency-Based Visual Attention for Rapid Scene Analysis," IEE Transactions on Pattern Analysis and Machine Intelligence, 20, 1254-1259, 1998.
Itti L., et al., "Bayesian Suprise Attracts Human Attention," Vision Research 49: 1295-1306, 2008.
Itti, L., et al., "Computational Modeling of Visual Attention," Nature Reviews Neuroscience, 2, 194-203, 2001.
Itti, L., "Quantifying the Contribution of low-level saliency to human eye movements in dynamic scenes," Visual Cognition, 12, 1093-1123, 2005.
Keysers, C., et al., "The Speed of Sight," Journal of Cognitive Neuroscience, 13(1). 90-101, 2001.
Khosla D., et al., "Bio-Inspired Visual Attention and Object Recognition," In: Proc. SPIE Defense, Security, and Sensing, 6560, 656003, 2007.
Khosla D., et al., "A bio-inspired system for spatio-temporal recognition in static and video imagery," Proc. SPIE 6560, 656002, 2007.
Koch C., et al., "Shifts in Selective visual attention: towards the underlying neural circuitry," Human Neurobiology, 4:219-227, 1985.
Lazebnik S., et al., "Beyond Bags of Features: spatial pyramid matching for recognizing natural scene categories," In: Proc. IEEE Conference on Computer Vision and Pattern Recognition (CVPR), 2006.
Ling, H., et al., "Diffusion distance for histogram comparison," IEEE Computer Society Conference on Computer Vision and Pattern Recognition (CVPR), 2006.
Medasani, S., et al., "Possibilistic particle swarms for optimization," Proceedings 5673 of SPIE/IST Symposium on Electronic Imaging, 2005.
Medasani, S., et al., "Active learning system for object fingerprinting," International Joint Conference on Neural Networks, 2004.
Morrison, D., et al., "Semantic clustering of images using patterns of relevance feedback," in Proceedings of the 6th International Workshop on Content-based Multimedia Indexing (CBMI 2008), London, UK.
Nane S.A., et al., "Columbia Object Image Library (COIL-100)," Technical Report CUCS-006-96, Feb. 1996.
Navalpakkam V., et al., Modeling the Influence of Task on Attention, Vision Research, 45: 205-231, 2005.
Navalpakkam V., et al., "An integrated model of top-down and bottom-up attention for optimal object detection," In: Proc. IEEE Conference on Computer Vision and Pattern Recognition (CVPR), 1-7, 2006.
Navalpakkam V., et al., "Sharing resources: buy attention, get recognition," In: Proc. International Workshop on Attention and Performance in Computer Vision (WAPCV'03), Graz, Austria, Jul. 2003.
Navalpakkam, V., et al., "Search goal tunes visual features optimally," Neuron, 53, 605-617, 2007.
Niebur E., et al., "Control of selective visual attention: modeling the 'where' pathway," In D. Touretzky, M. Mozer and M. Hasselmo. Neural Information Processing Systems (NIPS 8), 802-808, Cambridge, MA, MIT, Press 1996.
Orabona F., et al., "Object-based Visual Attention: A Model for a Behaving Robot," In 3rd International Workshop on Attention and Performance in Computational Vision (in CVPR 2005), San Diego, CA, Jun. 2005.
Owechki, Y., et al., "A swarm-based volition/attention framework for object recognition," IEEE Conference on Computer Vision and Pattern Recognition, San Diego, 2005.
Owechko, Y., et al., "Cognitive swarms for rapid detection of objects and associations in visual imagery," IEEE Swarm Intelligence Symposium, 2005.
Peters, R.J., et al., "Beyond bottom-up: Incorporating task-dependent influences into computational model of spatial attention," in: Proc. IEEE Conference on Computer Vision and Pattern Recognition (CVPR), 2007.
Rogowitz, B.E., et al., "Perceptual image similarity experiments," Proceedings of SPIE, 3299: 576-590, 1998.
Scholl B.J. "Objects and Attention: the state of the art," Cognition 80, 1-46, 2001.
Serre T., et al., "Object recognition with features inspired by visual cortex," in Proceedings of the IEEE conference on computer vision and pattern recognition (CVPR), San Diego, CA, Jun. 2005.

(56) References Cited

OTHER PUBLICATIONS

Smeulders, A., et al., "Content-based image retrieval at the end of the early years," IEEE Transactions on PAMI, 22(12): 1349-1360, 2000.
Sun Y., et al., "Hierarchical selectivity for object-based visual attention," Submitted to Artificial Intelligence, 2004.
Sun, Y., et al, "Probabilistic judgment by a coarser scale: behavioral and ERP evidence," in Proceedings of the Twenty-sixth Annual meeting of the Cognitive Science Society, 2004.
Thorpe, S., et al., "Speed of processing in the human visual system," Nature, vol. 381, pp. 520-522, 1996.
University of California, San Diego Complex Systems and Cognition Laboratory, CSCLAB Image Database http://csclab.ucsd.edu/labeledimages.php. 2006.
Walther D., et al, "Attentional selection for object recognition—a gentle way," Lecture Notes in Computer Science 2525: 472-479, 2002.
Wolfe J.M., "Visual Search in continuous, naturalistic stimuli," Vision Research 34: 1187-1195, 1994.
Vazirani, V., "Approximation Algorithms," Springer-Verlag, Berlin, Germany, pp. 32-33 (2004).
Vogel, E.K., et al., "The Visual NI Component as an index of a discrimination process," Psychophysiology, 2000.
Yamaguchi, S., et al., "Cerebral Asymmetry of the 'Top-down'0 allocation of attention to global and local features," The Journal of Neuroscience, 20, 1-5, 2000.
Zang H., et al., "SVM-KNN: Discriminative nearest neighbor classification for visual category recognition," CVPR 2006 26, Vazirani, V., "Approximation algorithms," Springer-Verlag, Berlin, Germany, p. 32, 2004.
http://en.wikipedia.org/Travelling_salesman_problem, Dec. 2, 2009.
Richard P. Wildes, "A measure of motion salience for surveillance applications" in Proc. IEEE Int'l Conf. Image Processing, 1998.
B. Draper and A. Lionelle. Evaluation of Selective Attention under Similarity Transforms. In Workshop on Performance and Attention in Computer Vision. Graz, Austria, Apr. 2003.
L. Itti and P. Baldi, Bayesian Suprise Attracts Human Attention, Vision Research 49: 1295-1306, 2008.
L. Itti and C. Koch, A saliency-based search mechanism for overt and covert shifts of visual attention, Vision Research, 40: 1489-1506, 2000.
L. Itti, C., Koch, and E. Niebur, A Model of Saliency-Based Visual Attention for Rapid Scene Analysis, IEEE Transactions on Pattern Analysis and Machine Intelligence, 20, 1254-1259, 1998.
D. Khosla, C. Moore, D. Huber, S. Chelian. Bio-Inspired Visual Attention and Object Recognition. In: Proc. SPIE Defense, Security, and Sensing, 6560, 656003, 2007.
V. Navalpakkam, L. Itti, Modeling the Influence of Task on Attention, Vision Research, 45: 205-231, 2005.
V. Navalpakkam, and L. Itti. An integrated model of top-down and bottom-up attention for optimal object detection, In: Proc. IEEE Conference on Computer Vision and Pattern Recognition (CVPR), 1-7, 2006.
F. Orabona, G. Metta, and G. Sandini. Object-based Visual Attention: A Model for a Behaving Robot. In 3rd International Workshop on Attention and Performance in Computational Vision (in CVPR 2005). San Diego, CA, Jun. 2005.
C. Stauffer and W.E.L. Grimson, "Adaptive background mixture models for real-time tracking," Int. Conf. Computer Vision and Pattern Recognition, vol. 2, pp. 246-252, 1999.
A. Elgammal, D. Harwood, and L.S. Davis, "Non-parametric model for background subtraction," European Conf. Computer Vision, vol. 2, pp. 751-767, 2000.

T. Kohonen, "Learning vector quantization," Neural Networks, vol. 1, pp. 3-16, 1988.
Kyungnam Kim, Thanarat H. Chalidabhongse, David Harwood, and Larry Davis, "Realtime foreground-background segmentation using codebook model," Real-Time Imaging, vol. 11, Issue 3, Jun. 2005.
R. Eckhorn, R. Bauer, W. Jordan, M. Brosch, M. Kruse, W. Munk, and H.J. Reitboeck. Coherent Oscillations: A Mechanism of Feature Linking in the Visual Cortex? Biological Cybernetics 60; 121-130, 1988.
C.M. Gray, P. Konig, A.K. Engel, and W. Singer, Oscillatory Responses in Cat Visual Exhibit Intercolumnar Synchronization Which Reflects Global Stimulus Properties. Nature 338: 334-336, 1989.
L. Itti and C. Koch. A saliency-based search mechanism for overt and covert shifts of visual attention. Vision Research, 40: 1489-1506, 2000.
L. Itti, C. Koch, and E. Niebur. A Model of Saliency-Based Visual Attention for Rapid Scene Analysis. IEEE Transactions on Pattern Analysis and Machine Intelligence, 20, 1254-1259, 1998.
V. Navalpakkam, and L. Itti, An Integrated model of top-down and bottom-up attention for optimal object detection, In: Proc. IEEE Conference on Computer Vision and Pattern Recognition (CVPR), 1-7, 2006.
S.A. Nene, S.K. Nayar, and H. Murase, Columbia Object Image Library (COIL-100). Technical Report CUCS-006-96. Feb. 1996. http://www.cs.columbia.edu/CAVE/software/softlib/coil-100.php.
E. Niebur, C. Koch. Control of Selective Visual Attention: Modeling the 'Where' Pathway. In. D. Touretzky, M. Mozer, and M. Hasselmo. Neural Information Processing Systems (NIPS 8). 802-808 Cambridge, MA, MIT Press. 1996.
F. Orabona, G. Metta, and G. Sandini. Object-based Visual Attention: A Model for a Behaving Robot. In 3rd International Workshop on Attention and Performance in Computational Vision (in CVPR 2005), San Diego, CA, Jun. 2005.
B.J. Scholl. Objects and Attention: The State of the Art Cognition 80: 1-46, 2001.
Y. Sun and R. Fisher. Hierarchical Selectivity for Object-based Visual Attention, Submitted to Artificial Intelligence, 2004.
D. Walther, L. Itti, M. Riesenhuber, T. Poggio, and C. Koch. Attentional Selection for Object Recognition—a Gentle Way. Lecture Notes in Computer Science 2525: 472-479, 2002.
J.M. Wolfe. Visual Search in Continuous, Naturalistic Stimuli, Vision Research 34: 1187-1195, 1994.
University of California, San Diego Complex Systems and Cognition Laboratory. CSCLAB Image Database, 2006, http://csclab.ucsd.edu/labeledimages.php.
Kyungnam Kim, Thanarat H. Chalidabhonse, David Harwood, and Larry Davis, "Realtime foreground-background segmentation using codebook model," Real-Time Imaging, vol. 11, Issue 3, Jun. 2005.
Huber, D. and Khosia, D. "A Bio-Inspired Method and System for Visual Object-Based Attention and Segmentation" Proc. SPIE 7696, 769613 (SPIE Defense, Security, and Sensing), 2010.
D. Simon in "Kalman Filtering with State Constraints: A Survey of Linear and Nonlinear Algorithms," IET Control Theory & Applications, vol. 4, Issue 8, Aug. 2010, pp. 1303-1318.
Kyungnam Kim et al. in "Real-time foreground-background segmentation using codebook model," in Real-Time Imaging, vol. 11, Issue 3, Jun. 2005.
Liu et al. in "Learning to Detect a Salient Object" In Proceedings of the IEEE Conference on Computer Vision and Pattern Recognition (CVPR), Minneapolis, Minnesota, 2007.
Deng Cai et al. in "Hierarchical clustering of WWW image search results using visual, textual and link information," in the proceedings of the 12th annual ACM International conference on multimedia, pp. 952-959, 2004.

* cited by examiner

MOTION-SEEDED OBJECT BASED ATTENTION FOR DYNAMIC VISUAL IMAGERY

CROSS-REFERENCE TO RELATED APPLICATIONS

This is a Continuation-in-Part application of U.S. Non-Provisional application Ser. No. 12/214,259, filed on Jun. 16, 2009, entitled, "Visual Attention and Segmentation System", which is a Continuation-in-Part application of U.S. Non-Provisional application Ser. No. 11/973,161, filed on Oct. 4, 2007, entitled, "Visual Attention and Object Recognition System", now issued as U.S. Pat. No. 8,165,407. This application is ALSO a Non-Provisional patent application of U.S. Provisional Application No. 61/589,781, filed in the United States on Jan. 22, 2012, titled, "Motion-Seeded Object Based Attention for Dynamic Visual Imagery."

BACKGROUND OF THE INVENTION (1) Field of Invention

The present invention relates to a system for object detection from dynamic visual imagery and, more particularly, to a system for object detection from dynamic visual imagery that utilizes motion processing and biologically-inspired segmentation based on feature contours.

(2) Description of Related Art

Many techniques exist for finding objects of interest in imagery and segmenting such objects. For instance, several researchers have shown interest in systems that compute the saliency of a scene. Two particular theories have emerged from this interest: attention that focuses on features at specific loci in the scene, and attention that focuses on the saliency of specific objects or colored "blobs" in a scene. These methods are called feature-based and object-based attention, respectively. Researchers have found evidence that supports each of these, and both methods have exhibited utility for a variety of applications.

Feature-based attention works at the pixel level and computes attention based on the saliency of a given location within the scene at a specific location. The attention work of Itti and Koch (see List of Cited Literature References, Literature Reference No. 4) employs such an approach, which computes attention by constructing a saliency map from a set of biologically inspired features extracted from the image, and has been modified to incorporate top-down biasing of the attention (see Literature Reference Nos. 6 and 7). The algorithm breaks apart the image into a set of Gaussian pyramids corresponding to color, intensity, and orientation at a series of scales, which are combined across scales and merged into the saliency map. The system attends to the point that corresponds to the maximum value in the saliency map, applies inhibition of return to that location, and shifts to the next most salient point. This process continues until the program attends to a maximum number of locations, or the user terminates the program.

An extension of the attention mechanisms described above was developed and described in Literature Reference No. 13, which segments the region around the most salient point, returning a region of interest instead of a simple point in the image. The most significant problem with the method described in Literature Reference Nos. 4, 6, and 7 is its inefficiency; in spite of the inhibition of return mechanism, the algorithm routinely returns to previously attended locations if a better point is not found. The algorithm lacks the type of queuing system required to efficiently attend to every location in the image. Some groups (see Literature Reference No. 1) have also found that this algorithm does not exhibit invariance to the orientation of a scene: when the algorithm analyzes the same image twice, one being slightly rotated relative to the other, it returns dramatically different salient regions for each. The algorithm described in Literature Reference No. 13 exhibits its own limitations. In particular, the segmentation employed, while feature-based, appears arbitrary when actually applied and does not correspond to actual objects or blobs. These attention systems above were also outlined in detail in U.S. Pat. No. 6,670,963, entitled, "Visual Attention Model" and U.S. Patent Publication No. 2005/0047647, entitled, "System and Method for Attentional Selection", which are hereby incorporated by reference as though fully set forth herein.

The work of Itti et al. and Walther (see Literature Reference Nos. 4-7 and 13) is used to process motion cues using the same mechanism. The methods use a frame differencing approach where the intensity channels are compared at directional offsets in the up, down, left, right, and in place (i.e., no offset, called "flicker") directions. This allows the system to detect motion in the frame. However, this motion is not related to any of their color channels. Furthermore, this method does not create a background model, and the system cannot "learn" what motion in the scene is normal and what motion is anomalous. As a result, the algorithms described in Itti et al. and Walther (see Literature Reference Nos. 4-7 and 13) are very noisy and return many false alarms from non-threatening moving objects (e.g., trees).

Object-based approaches to attention focus on tangible objects within the scene, and compute attention based on the saliency of the objects composing the scene, determining which "stands out" from the others. The authors of Literature Reference No. 12 proposed an object-based attention mechanism, in which they compute attention for a set of objects within a manually segmented image at multiple scales. For example, at a coarse scale, they segment out a canoe on the water; at a finer scale, they segment the actual canoe, as well as each of the passengers on the canoe. The algorithm computes the saliency of each object based on features extracted from the scene and shifts attention between scales and between objects, but handicaps itself with its requirement that the scene be manually segmented before the attention can be computed.

The authors of Literature Reference No. 10 developed an object-based approach that does not require manual segmentation. Their method computes three feature maps from the image and uses them to compute the segmentation using a watershed flooding process, which segments the image into "proto-objects", corresponding to regions with uniform features. The system computes the saliency of each proto-object from the feature maps as well. The system shifts attention between regions in the order of saliency, and applies inhibition to previously attended regions. This group also proposed a simple top-down mechanism for biasing attention. However, for practical applications, their implementation of the watershed process over segments the scene into regions that encode for small fragments of objects, and not complete blobs or proto-objects. Its small feature set and lack of intensity information limits the ability of the process to find complex feature contours. Finally, the use of the log-polar transform of the scene as input creates an undesired blind spot for object boundaries near the center of the image. The log-polar transform spreads out objects near the middle of the scene, blurring the object boundaries. This obscures the feature contrast and makes it difficult for the edge-detection process to find a feature contour. Since the watershed process can only process closed feature contours, these objects are ignored.

The work described in Literature Reference No. 19 employs motion processing using a codebook in order to extract anomalous motion patterns from a series of frames in video. The object-based attention work described in Literature Reference No. 20, which improved upon the work of Literature Reference No. 10, extracts proto-objects from static imagery. However, it consists of a simple saliency algorithm and does not work on video imagery. Further, the work described in Literature Reference No. 19 is capable of processing motion information from dynamic imagery. However, the blobs it returns sometimes leave out pieces of objects or are incomplete.

Each of the prior methods discussed above exhibit limitations that make them incomplete. This is due to the problems that they exhibit in their limited application to natural scenes and in their theoretical structure. The prior work in Literature Reference Nos. 19 and 20 is also improved upon by the innovations disclosed herein. In particular, while the work of Literature Reference No. 20 was a major improvement, it is not well-suited to dynamic imagery that requires high frame rate; the processing involved in computing the saliency for a sequence of frames in video imagery is prohibitively expensive (i.e., incapable of running at 20-30 frames per second (fps), which is required of real-time video analysis systems), since processing the watershed regions is a computationally expensive procedure. This algorithm also employed pure saliency, which does not learn patterns from the scene as time goes by.

Thus, a continuing need exists for a system for object detection and segmentation in dynamic imagery that is robust, efficient, and produces accurate segmentation of a scene.

SUMMARY OF THE INVENTION

The present invention relates to a system for object detection from dynamic visual imagery and, more particularly, to a system for object detection from dynamic visual imagery that utilizes motion processing and biologically-inspired segmentation based on feature contours. The system comprises one or more processors and a memory having instructions such that when the instructions are executed, the one or more processors perform multiple operations including first receiving, as input, video imagery comprising a plurality of frames. Each frame is processed to detect at least one motion region exhibiting unexpected motion, wherein the at least one motion region represents a moving object in the video imagery. Object-based feature extraction is applied to each frame containing a detected motion region. Then, each frame containing a detected motion region is divided into a plurality of feature-consistent regions. In each frame containing a detected motion region, at least one motion seeded region (MSR) in the plurality of feature-consistent regions is identified, wherein the MSR corresponds to a spatial location of the detected motion region in the frame. A plurality of similar feature-consistent regions that are adjacent to and include the MSR are joined to compute a boundary around the plurality of similar feature-consistent regions. Finally, for each frame containing a detected motion region, a computed boundary surrounding an object in the detected motion region is output.

In another aspect, a motion seeded feature (MSF) is identified in each feature-consistent region, wherein the MSF is the feature that is consistent in the plurality of feature-consistent regions.

In another aspect, a list X is defined as a list of all detected motion regions. The MSR is defined as a first region in the list X for a first iteration. A list N comprising all feature-consistent regions adjacent to the MSR is defined. A relative difference value across the MSF between the MSR in the list X and a candidate feature-consistent region in the list N is computed. If the relative difference value is less than a predetermined threshold, then the candidate feature-consistent region is accepted as part of a detected motion region and added to the list X. If the relative difference value is more than a predetermined threshold, then the candidate feature-consistent region is rejected.

In another aspect, for a plurality of iterations, a relative difference value between each detection motion region in the list X and each feature-consistent region in the list N is computed.

In another aspect, the video imagery comprises red, green, and blue color channels. The system calculates intensity channels, comprising light intensity channels and dark intensity channels, from the video imagery by averaging the red, green, and blue color channels. Four fully-saturated color channels are created, comprising red, blue, green, and yellow color channels, that yield zero-response to white, wherein effects of the color channels and the intensity channels are separated.

In another aspect, a set of feature maps is computed from the four fully-saturated color channels and the intensity channels. Gradient information for each feature map in the set of feature maps is then computed to generate a set of edge maps. A master edge map comprising feature contour areas is computed by combining the set of edge maps. The master edge map is processed to complete a boundary around the detected motion region and close the feature contour areas in the master edge map. The master edge map is then input into a watershed process, wherein the watershed process converts the feature contour areas into the feature-consistent regions.

As can be appreciated by one in the art, the present invention also comprises a method for causing a processor to perform the operations described herein.

Finally, the present invention also comprises a computer program product comprising computer-readable instruction means stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
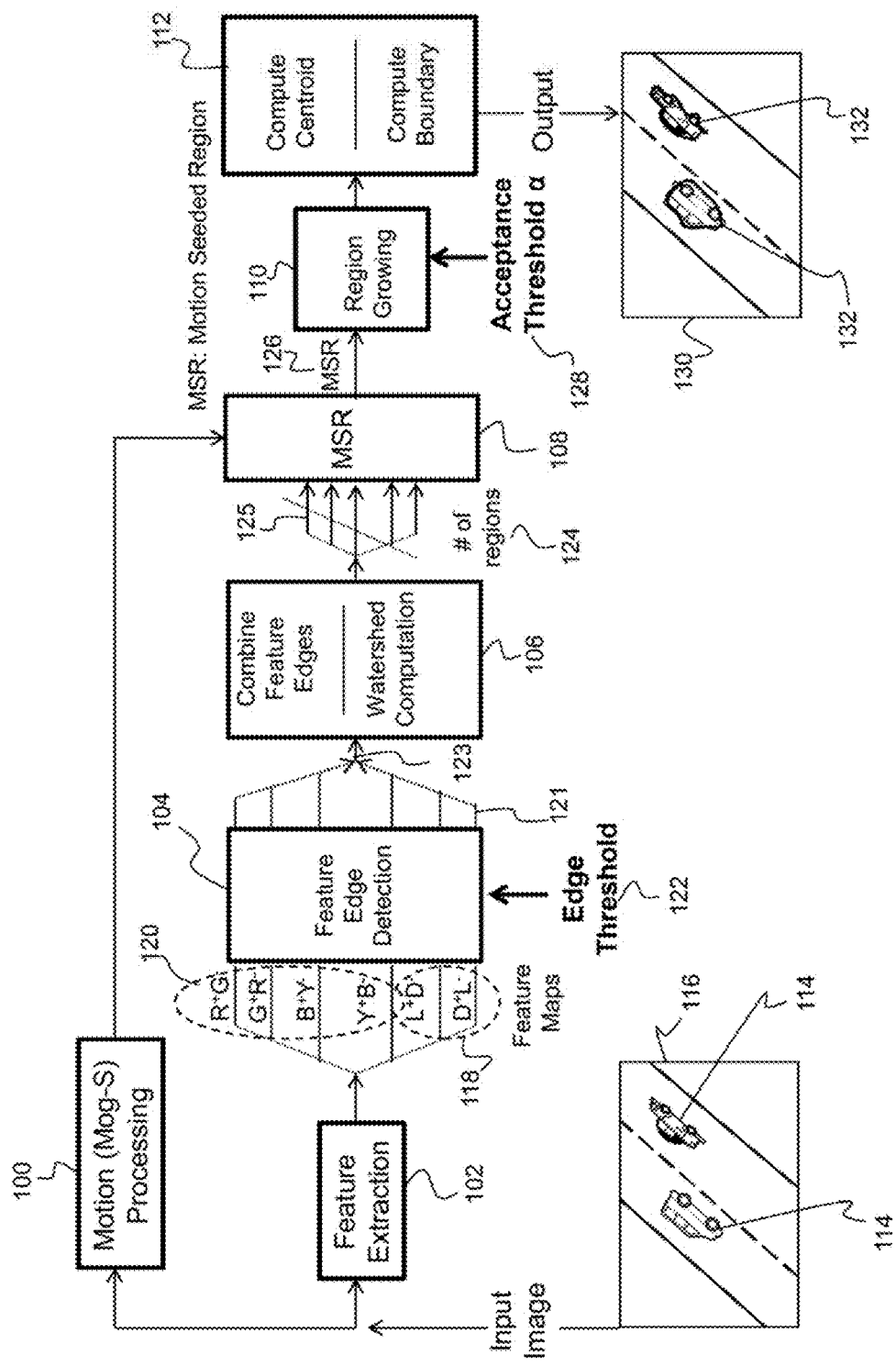
FIG. 1 is a diagram depicting an attention and segmentation system according to the present invention.

The present invention relates to a system for object detection from dynamic imagery and, more particularly, to a system for object detection from dynamic imagery that utilizes motion processing and biologically-inspired segmentation based on feature contours. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Subsequently, a description of various principal aspects of the present invention is provided. Finally, specific details of the present invention are provided to give an understanding of the specific aspects.

(1) LIST OF CITED LITERATURE REFERENCES

The following references are cited throughout this application. For clarity and convenience, the references are listed herein as a central resource for the reader. The following references are hereby incorporated by reference as though fully included herein. The references are cited in the application by referring to the corresponding literature reference number.

1. B. Draper and A. Lionelle. Evaluation of Selective Attention under Similarity Transforms. In *Workshop on Performance and Attention in Computer Vision*. Graz, Austria, April 2003.
2. R. Eckhorn, R. Bauer, W. Jordan, M. Brosch, M. Kruse, W. Munk, and H. J. Reitboeck. Coherent Oscillations: A Mechanism of Feature Linking in the Visual Cortex? *Biological Cybernetics* 60: 121-130, 1988.
3. C. M. Gray, P. Konig, A. K. Engel, and W. Singer. Oscillatory Responses in Cat Visual Cortex Exhibit Intercolumnar Synchronization Which Reflects Global Stimulus Properties. *Nature* 338: 334-336, 1989.
4. L. Itti and C. Koch. A saliency-based search mechanism for overt and covert shifts of visual attention. *Vision Research*, 40: 1489-1506, 2000.
5. L. Itti, C. Koch, and E. Niebur. A Model of Saliency-Based Visual Attention for Rapid Scene Analysis. *IEEE Transactions on Pattern* Analysis and Machine Intelligence, 20, 1254-1259, 1998.
6. V. Navalpakkam, L. Itti, Modeling the Influence of Task on Attention. *Vision Research*, 45: 205-231, 2005.
7. V. Navalpakkam, and L. Itti. An integrated model of top-down and bottom-up attention for optimal object detection, In: *Proc. IEEE Conference on Computer Vision and Pattern Recognition (CVPR)*, 1-7, 2006.
8. S. A. Nene, S. K. Nayar, and H. Murase. Columbia Object Image Library (COIL-100). *Technical Report CUCS*-006-96. February 1996.
9. E. Niebur, C. Koch. Control of Selective Visual Attention: Modeling the 'Where' Pathway. In. D. Touretzky, M. Mozer, and M. Hasselmo. Neural Information Processing Systems (NIPS 8). 802-808. Cambridge, Mass., MIT Press. 1996.
10. F. Orabona, G. Metta, and G. Sandini. Object-based Visual Attention: A Model for a Behaving Robot. In $3^{rd}$ *International Workshop on Attention and Performance in Computational Vision (in CVPR* 2005), San Diego, Calif., June 2005.
11. B. J. Scholl. Objects and Attention: The State of the Art. *Cognition* 80: 1-46, 2001.
12. Y. Sun and R. Fisher. Hierarchical Selectivity for Object-based Visual Attention. Submitted to *Artificial Intelligence*. 2004.

13. D. Walther, L. Itti, M. Riesenhuber, T. Poggio, and C. Koch. Attentional Selection for Object Recognition—a Gentle Way. *Lecture Notes in Computer Science* 2525: 472-479, 2002.
14. J. M. Wolfe. Visual Search in Continuous, Naturalistic Stimuli. *Vision Research* 34: 1187-1195, 1994.
15. University of California, San Diego Complex Systems and Cognition Laboratory. CSCLAB Image Database. 2006.
16. C. Stauffer and W. E. L. Grimson, "Adaptive background mixture models for real-time tracking," Int. Conf. Computer Vision and Pattern Recognition, Vol. 2, pp. 246-252, 1999.
17. A. Elgammal, D. Harwood, and L. S. Davis, "Non-parametric model for background subtraction," European Conf. Computer Vision, Vol. 2, pp. 751-767, 2000.
18. T. Kohonen, "Learning vector quantization," Neural Networks, Vol. 1, pp. 3-16. 1988.
19. Kyungnam Kim, Thanarat H. Chalidabhongse, David Harwood, and Larry Davis, "Realtime foreground-background segmentation using codebook model," Real-Time Imaging, Volume 11, Issue 3, June 2005.
20. Huber, D. and Khosla, D. "A Bio-Inspired Method and System for Visual Object-Based Attention and Segmentation" Proc. SPIE 7696, 769613 (SPIE Defense, Security, and Sensing), 2010.

(2) PRINCIPAL ASPECTS

The present invention has three "principal" aspects. The first is a system for object detection for dynamic visual imagery. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for object detection for dynamic visual imagery. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(3) SPECIFIC DETAILS

(3.1) Introduction

Humans can analyze a scene very quickly and easily, effortlessly noticing objects of interest, even those that the viewer has never seen before. A viewer may be looking for something in particular or simply be looking for things "out of the ordinary" or unexpected; this affects how attention is paid within the scene. Natural scenes that a person likely encounters on a day-to-day basis are often very complex, made more so by lighting conditions. However, developing an artificial vision system that pays attention to a scene and extracts regions and objects of interest provides a great challenge.

A vision system must be able to determine what locations in a scene draw the most attention, and then segment the attended object so that it can be identified or interpreted. To maintain real-time operation, the attention process must work efficiently. The segmentation process must be able to cope with scenes containing complex lighting and shading conditions, so that the integrity of an object boundary is maintained, and the segmentation boundary must be close enough to the object to minimize background noise that leads to misclassification of the object. It should also be able to adjust between scales, to extract large objects or textures and then "zoom in" to examine the constituent parts of the object. The ability to examine the essential parts of an object is critically important in object recognition. When the recognizing process cannot identify the object, the attention process can then look at the individual parts of the large object, and the identification system can attempt to construct a representation of the larger object based on its parts. The invention described herein solves each of these problems.

FIG. 1 illustrates a diagram of the system, including the critical processes at each stage. As shown, the main modules are a motion processing (Mog-S) module 100, a feature extraction module 102, a feature edge detection module 104, a watershed computation module 106, a motion seeded region (MSR) module 108, a region growing module 110, and a feature boundary computation module 112. Each of these modules and their connections will be described in further detail below. The invention involves a fusion of motion anomaly detection and the feature- and object-based paradigms of attention, rather than relying on one or the other exclusively.

The present invention implements a system partially inspired by neuroscience for finding and segmenting objects of interest for further processing by either a human operator or a target recognition system. In summary, the system processes the scene for some number of frames (a block) using an advanced motion detection process and determines small regions in the scene (i.e., "blobs") that are moving conspicuously within the scene. At the end of each block, the system computes a series of feature maps and feature regions for each frame in which the motion detection process detected an object of interest. Finally, the system performs ordered segmentation of the salient objects by drawing a boundary around the object. The boundary is represented as an outline drawn tightly around the object, and not as a bounding box or vague ellipsoidal region. The system then repeats this process for each frame in the video feed. Since each feature region in each frame cannot appear in multiple objects, the system will not revisit previously attended objects, which ensures that the detection mechanism performs efficiently. The technology described herein can be applied to a large range of natural scenes exhibiting a variety of lighting conditions that cause trouble for other object-based attention systems.

(3.2) Motion-Based Object Detection (Mog-S)

The present invention is useful for any application that involves monitoring a scene for the purpose of finding interesting or unexpected regions or occurrences. In the present application, "expected" motion is any type of motion that occurs with regularity and is captured during the training period of the motion detection process. Objects such as flags or trees blowing in the wind might be considered "expected" motion. The motion detection process is trained to adapt to this type of motion by incorporating it into the background model. Further, "unexpected" motion is a type of motion that violates the background model in some way, such as a person walking across the scene.

As shown in FIG. 1, the motion processing module 100 of the present invention utilizes a motion processing process, Mog-S, to detect foreground or moving objects 114 (e.g., cars) from an input image 116 (e.g., video) taken by a stationary camera. This motion-based saliency technique is based on modeling the background and subtracting it from the input image 116, as described below.

A background model is constructed and updated by the codebook-based method (see Literature Reference No. 19). It adopts a quantization/clustering method (see Literature Reference No. 18) to construct a background model from observation sequences. For each pixel, it builds a codebook consisting of one or more codewords. Samples at each pixel are clustered into the set of codewords based on a color distortion metric together with a brightness ratio. Not all pixels have the same number of codewords. The background is encoded on a pixel-by-pixel basis. Thus, a pixel is represented by a codebook which consists of one or multiple codewords. Each codeword contains an RGB-vector and other features, such as, but not limited to, the minimum and maximum brightness that the codeword accepted; the frequency with which the codeword has occurred; the maximum negative run-length (MNRL) defined as the longest interval during the training period that the codeword has not recurred; and the first and last access times that the codeword has occurred. These feature values are effectively used to evaluate color and brightness differences, filter out non-background pixels, and recycle unused codewords.

(3.2.1) Color Model and MNRL Filtering

One advantageous characteristic of the codebook technique is its color model that separates the color and brightness distortion evaluations to cope with the problem of illumination changes such as shading and highlights. The color and brightness conditions are satisfied only when the pure colors of the input pixel and the codeword are close enough, and the brightness of the input pixel lies between the acceptable brightness bounds of the codeword (see Literature Reference No. 19).

The codebook which encodes every incoming pixel in the training set is referred to as the fat codebook. In the temporal filtering step, the fat codebook is refined by separating the codewords that might contain moving foreground objects from the true background codewords, thus allowing moving foreground objects during the initial training period. The true background, which includes both static pixels and moving background pixels, usually is quasi-periodic (i.e., values recur in a bounded period). This motivates the temporal criterion of MNRL ($\lambda$), which is defined as the maximum interval of time that the codeword has not recurred during the training period. A codeword having a large $\lambda$ will be eliminated from the codebook. Even though a pixel has a large frequency 'f', its large $\lambda$ means that it is mostly a foreground event which was stationary only for that period f. On the other hand, a pixel with a small f and a small $\lambda$ could be a rare background event occurring quasi-periodically.

Figure 2:
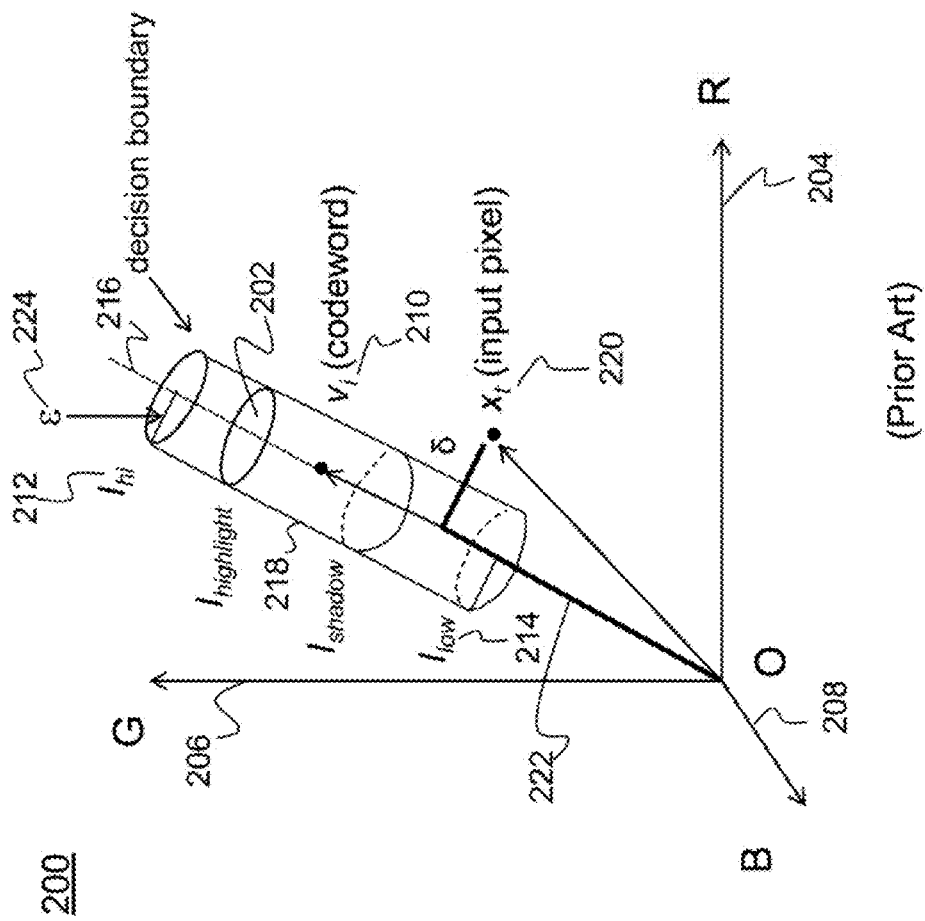
FIG. 2 is a diagram of a color model for separate evaluation of color distortion and brightness distortion.

FIG. 2 shows an example of a background model 200 for a single pixel. Based on a series of input frames for "training", a tolerance cylinder 202 is built for each pixel. The axes of the model 200 represent the color values of the red (R) 204, green (G) 206, and blue (B) 208 channels for a single pixel. The point labeled as $v_i$ (codeword) 210 is the average RGB value of the pixel over the set of training frames. From the training set, one is able to determine a maximum allowable range for pixel intensity, indicated by the top ($I_{hi}$) 212 and bottom (($I_{low}$) 214 of the cylinder 202, as allowable by the model. The brightness/intensity of the pixel is indicated by the dotted line 216 that passes lengthwise through the cylinder 202. One can also determine permissible color changes, as indicated by the wall 218 of the cylinder 202, as allowable by the model. One can then determine the feature that triggers the response by looking at the position of the pixel's RGB value $x_t$ (input pixel) 220 relative to the cylinder 202.

Each pixel in the frame gets its own cylinder 202. When flames are processed, one determines whether a pixel falls within or outside of its cylinder 202 based on its RGB value $x_t$ (input pixel) 220. If the pixel is within the cylinder 202, then nothing happens; if the pixel falls outside of the cylinder 202, then it is flagged as moving. In this case, one looks at the location of the pixel in RGB space relative to the cylinder 202 (which represents the background model) to determine which color/feature caused the motion detection. If the pixel is above or below the cylinder 202, but within its radius, then one uses either the light (LD) or dark (DL) feature from object-based feature extraction as the "motion seeded feature" (hereinafter referred to as the MSF). A MSF is the feature that joins all of the watershed regions for a given object. The concept is to work around changes in illumination, or other color variances, within the moving object, so the region growing operation is performed by comparing adjacent watershed regions across a single feature, rather than across all features. For example, if the Mog-S process determines that a given moving object is red, then one wants to perform region growing using the "red" feature set and ignore the remaining features. The MSF corresponds to the feature in the watershed map that correlates with the color in MogS that violated the background model.

Referring back to FIG. 2, for points that exceed the radius of the cylinder 202, one has to compute the distance $\delta$ of the point from the nearest point along the axis of the cylinder 202 in each dimension (refer to line 222 in bold) as follows:

$$\delta R = \sqrt{(Rv_0 - Rx_t)^2}$$

$$\delta G = \sqrt{(Gv_0 - Gx_t)^2}$$

$$\delta B = \sqrt{(Bv_0 - Bx_t)^2},$$

where $x_t$ is the new point and $v_0$ is the nearest point along the axis of the cylinder 202, which removes the effect of the illumination from this calculation. If $\delta B$ is greater than both $\delta R$ and $\delta G$, then the MSF is the blue (BY) feature from object-based feature extraction. If $\delta R$ is larger than $\delta G$ by a certain factor $\epsilon_{RG}$, then the red (RG) feature is the MSF. $\epsilon$224 represents a free parameter. Likewise, if $\delta G$ is greater than $\delta R$ by a certain factor $\epsilon_{GR}$, then the green (GR) feature is the MSF. If neither of the RG or GR cases listed above is true, then the yellow (YB) feature is the MSF. The values for $\epsilon_{GR}$ and $\epsilon_{RG}$ are free parameters and can be experimentally optimized or arbitrarily determined by the user. Once one knows which feature to use as the MSF, one can then compare and combine watershed regions starting with the MSR, as described further below.

(3.2.2) Foreground Detection and Postprocessing

Subtracting the current image from the background model is straightforward. Unlike the Mixture-of-Gaussian method (see Literature Reference No. 16) or the kernel-based method (see Literature Reference No. 17), which compute probabilities using costly floating point operations, the codebook method does not involve probability calculation. Indeed, the probability estimate in the kernel-based method is dominated by the nearby training samples. The codebook method simply computes the distance of the sample from the nearest cluster mean. The computation is very fast and shows little difference in detection compared with the probability estimate. The pixel is detected as a foreground if no acceptable matching codeword exists. Otherwise it is classified as a background.

The motion processing module of the present invention performs a connected component process to group pixels into meaningful blobs. Additional blob information, non-limiting examples of which include centroid, aspect ratio, ground point, and principal body axis angle, is extracted to be used in the subsequent modules. After processing each frame, the process is able to report a series of "blobs" within the scene that appear to be moving in an inconsistent manner relative to the training.

Referring back to FIG. 1, these blobs are used by the MSR module 108 to seed regions for object segmentation and extraction. The motion processing in the motion processing module 100 is performed for one or many frames (a block of frames), and a plurality of motion detections are saved, ranked, and sent to the object-based feature extraction module 102. The motion processing is performed in parallel with the feature extraction of the feature extraction module 102, feature edge detection of the feature edge detection module 104, and watershed computation of the watershed computation module 106. At the MSR module 108, the motion processing results are polled to determine the MSR, and the object boundary is determined using the region growing module 110 and the feature boundary computation module 112.

Figure 3:
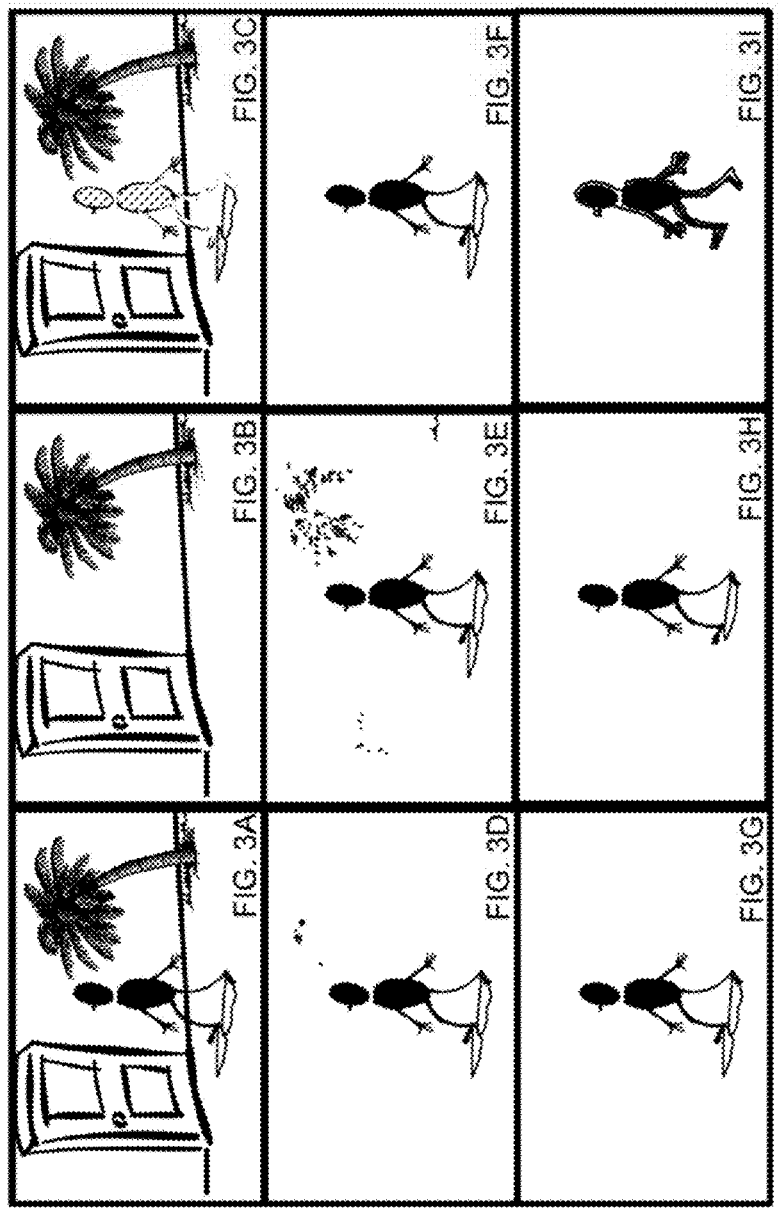
FIG. 3A illustrates an input image.
FIG. 3B illustrates a background image corresponding to the input image.
FIG. 3C illustrates a detection image by background subtraction of the input image.
FIG. 3D illustrates spot noise removal results of the input image.
FIG. 3E illustrates color-based expand/shrink results of the input image.
FIG. 3F illustrates size filtering results of the input image.
FIG. 3G illustrates hole filling results of the input image.
FIG. 3H illustrates boundary shape filtering results.
FIG. 3I illustrates boundary detection and corner finding results.

FIGS. 3A-3I illustrate the post-processing steps of the motion processing module 100 once foreground pixels are detected (see Literature Reference No. 19). FIG. 3A is an illustration depicting an input image of an object (e.g., person) in the foreground of the input image. FIG. 3B illustrates the corresponding background image with the object subtracted. FIG. 3C illustrates a detection image by background subtraction. FIG. 3D depicts the results of spot noise removal. FIG. 3E illustrates color-based expand/shrink results of the image. FIGS. 3F and 3G depict the results of size filtering and hole filling, respectively. FIG. 3H illustrates boundary shape filtering by rolling ball algorithm, for example. Finally, FIG. 3I depicts the results of boundary detection and corner finding by the system. In summary, the motion detection process (Mog-S) determines the background tolerance for pixels in the scene. When an object (e.g., person) walks in front, the background model is violated and the sum-total of the violating pixels provides a general silhouette of the moving object. All of the processing shown in FIGS. 3A-3I corresponds to the motion processing module 100 of FIG. 1.

(3.3) Object-Based Feature Extraction

Referring again to FIG. 1, after processing a block of frames to find "blobs" (representing objects 114) in the scene (i.e., input image 116) that appear to be moving by the motion processing module 100, object-based feature extraction is applied to the scene by the feature extraction module 102 in order to create an object boundary around incomplete or groups of motion blobs. This allows the system to create a concrete representation of a moving object 114, or proto-object, in the input image 116 that can be either analyzed by a human operator or sent to a target recognition system. By processing multiple frames and then processing only those frames that contain highly-salient targets (according to Mog-S), the need to process every frame through this stage is avoided. To further speed up processing, one might even perform this stage on a quadrant of the critical frames. Therefore, the first stage of the feature extraction module 102 is to subdivide the image into a population of feature-consistent regions that are used for object segmentation.

The feature extraction module 102 derives its inspiration from biologically inspired, object-based visual models, specifically those used in the preprocessing of the object attention method of Literature Reference No. 20. The visual system performs a rough segmentation on a scene based on the features it extracts. However, these do not correspond to entire objects or even to entire blobs of color as Literature Reference No. 10 asserts, but rather to feature variations, which may be affected by outside influences such as lighting conditions. This phenomenon is similar to the shards of a stained-glass window, or the fragments within a mosaic pattern. The viewer's attention immediately shifts to one of these small regions in a largely feature-based manner due to some saliency cue within that location. Just as quickly, the visual signal propagates to neighboring regions that share similar features. The propagation continues until the feature boundary has been discovered, and the resulting group of similarly featured shards is classified as a proto-object. An object of uniform color that is subjected to external lighting will exhibit a color gradient across its surface. The method described herein will be able to combine its constituent regions into a single object, although technically the regions are of different color.

The present invention's feature extraction module 102 uses, for example, six features including two intensity channels 118, L and D (light and dark), and four fully-saturated color channels 120 (red (R), green (G), blue (B), and yellow (Y)), representing input feature maps. The two intensity channels 118, L and D, are calculated from the input image 116 by averaging the red (r), green (g), and blue (b) channels: L=(r+g+b)/3 and D=255−L. Four fully-saturated color channels 120 are created (red (R), green (G), blue (B), and yellow (Y)) that yield zero-response to white, effectively separating the effects of the color and intensity channels:

$$R = r - \frac{(g+b)}{2},$$

$$G = g - \frac{(r+b)}{2},$$

$$B = b - \frac{(r+g)}{2}, \text{ and}$$

$$Y = \frac{(r+g)}{2} - \frac{|r-g|}{2} - b.$$

All negative values are thresholded at zero. Feature opponency maps corresponding to the receptive fields in the retina for red-center/green surround, green-center/red-surround, blue-center/yellow-surround, bright-center/dark-surround, and dark-center/bright-surround are computed from the input channels from the Difference of Gaussians (DoG) between an "ON" center feature, and a contrasting "OFF" surround feature. Both the center and surround channels are convolved with a two-dimensional Gaussian kernel, where the surround kernel has larger bandwidth than the center kernel. Each opponent feature map is computed when the surround channel is subtracted from the center channel. This process is repeated for each center-surround channel pairing.

As described above, the present system accepts input in the form of a static color input image 116 of a scene containing one or more objects 114 (e.g., people, cars). The input image 116 can be a photograph or a frame captured from a video stream. If black and white images are presented as an input image 116 to the feature extraction module 102, they are converted to an RGB color format (although they are still black and white images). The motion detection process (Mog-S) of the motion processing module 100 then determines small regions in the input image 116 (i.e., blobs) that are moving conspicuously within the input image 116.

To compute the segmentation of objects in a scene and the perceptual grouping of "blobs", the phase differences between neighboring visual conical neurons are used to determine the feature boundaries (see Literature Reference Nos. 2 and 3) in the feature edge detection module 104 The gradient information of each feature opponency map is computed by convolving it with, for instance, a Sobel filter, which extracts the edge information from each map in the feature edge detection module 104. A master edge map, E, is computed by representing each pixel (x,y) by its maximum value across all of the edge maps in a winner-take-all fashion often exhibited by neural cells as follows:

$$E(x,y) = \max\{E_{RG}(x,y), E_{GR}(x,y), E_{BY}(x,y), E_{YB}(x,y), E_{LD}(x,y), E_{DL}(x,y)\}.$$

The master edge map is processed to complete the boundaries and close the contours of the map, and then input into a watershed process of the watershed computation module 106, which converts the feature contour areas into feature-uniform regions. The watershed transform of the watershed computation module 106 simulates the parallel spread of the neural activation on the image (see Literature Reference No. 10).

Each of the six horizontal arrows extending from the feature edge detection module 104 represent feature edge maps 121 that are processed on each of the input feature maps (118 and 120). In short, six feature maps (118 and 120) go into the feature edge detection module 104 and are processed into feature edge maps 121. There is a 1:1 correspondence between a feature map inputted into the feature edge detection module 104 and the feature edge map 121. The feature edge maps 121 combine (as indicated by symbol 123) and are all used to create a single edge map that represents all features. This single edge map is then used by the watershed computation module 106.

According to research (see Literature Reference Nos. 2 and 3), the phase differences between neighboring visual cortical neurons are believed to contribute to the segmentation of objects in a scene and perceptual grouping of "blobs". The watershed transform simulates these activities. The group of arrows 125 with the line going through them between the watershed computation module 106 and the MSR module 108 represents an arbitrary (or unknown) number of watershed regions that are tested in the MSR module 108 to determine the motion seeded region (MSR 126). One can manipulate the scale of the image segmentation by manipulating the edge threshold 122 of the Sobel algorithm; increasing this value decreases the number of watershed regions 124 and results in a coarser segmentation, while decreasing this value results in a finer segmentation due to a higher number of watershed regions 124. The value of this tuning parameter depends on the class of scene, and can be adjusted by the user based on the nature of the search.

The system then finds the motion MSR 126 using the MSR module 108 and divides the scene into feature-consistent regions (i.e., MSRs 126). The MSR 126 is the feature region (or regions) that directly corresponds to the spatial location of a motion blob that is extracted by the motion processing module 100. The system then enters a process of region growing using the region growing module 110 in order to find the feature boundary of the object 114 (i.e., feature boundary computation module 112) containing each blob found by the motion processing module 100. The method of region growing in the region growing module 110 is inspired by the idea of synaptic plasticity between lateral neurons. In neurobiology, cells that respond similarly to the same stimulus strengthen their connections to one another and begin to behave as a cohesive unit. In the present invention, MSRs that are similarly excited by the same feature are connected so that they share the same saliency and object boundary. Joining the regions along the most salient feature and the propagation of the saliency signal along its neighbors is consistent with findings in object-based and Gestalt psychology, which indicate that regions that are either similar to one another or belong to the same object representation are attended to at the same time as a group. When presented with the properly-arranged parts of an object, a subject will recognize the object by itself, and not just as the combination of its individual parts. The process of region growing is described in further detail below.

(3.4) Region Growing

At this point, motion scores for each pixel in the image have been computed using Mog-S. The motion scores are determined based on how far the given pixel's color value falls from the background model, as described above. Furthermore, the frame has also been processed through the feature extraction module, the feature edge detection module, the watershed module, and the MSR module, resulting in a number of small regions (MSRs), where the pixels in each region correspond to roughly the same color feature set. The objective now is to find all objects in the scene that are detected by Mog-S and determine a boundary for each object. The objective is met by finding all regions that belong to the object and returning the boundary of their union.

Once the MSR has been found, the system enters a process of region growing (by a region growing module) in order to find the feature boundary of the object containing the MSR. In this case, the feature boundary is a dividing line between the union of the elements in a list X (i.e., all of the watershed regions that form the object) and all of the watershed regions that do not form the object. After the individual watershed regions that compose an object are combined, the boundary envelops the object. From a technical standpoint, the "boundary" is an array of pixel locations (x,y) that are continuous and compose the outer edge of the union of regions in X; there are no gaps in the boundary.

Figure 4:
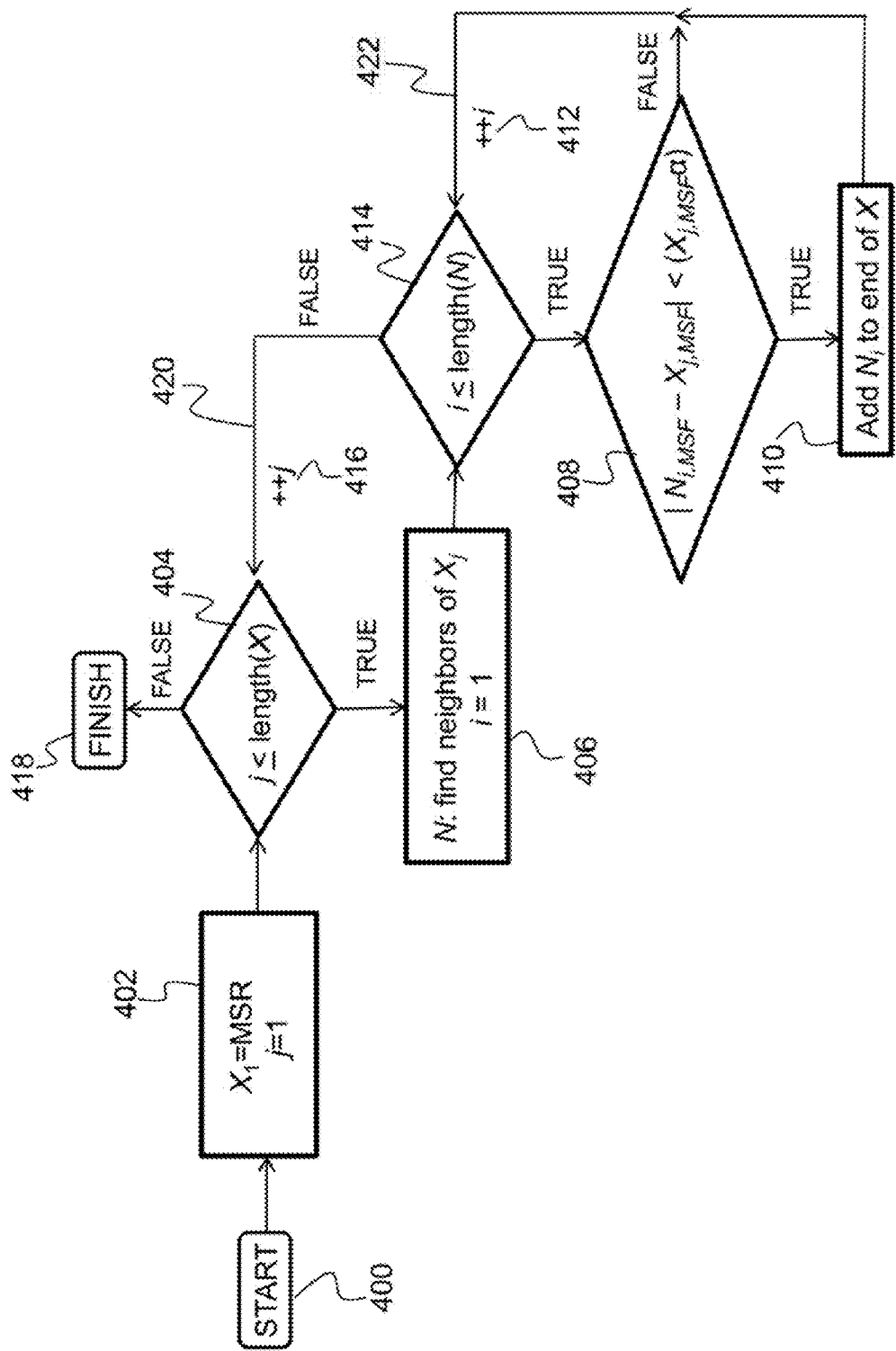
FIG. 4 is a flow chart depicting a region growing process according to the present invention.

FIG. 4 depicts a flowchart of the region growing module 110. The region growing module 110 comprises a process that creates a list, X, which is the listing of all regions that belong to an object detected by Mog-S. All elements in list X are contiguous. Initially, this list comprises only the MSR. By definition, each instance of X (and thus each object) contains only one MSR, which is the first element in list X. The boundary of the union of X and all watershed regions that match the MSR along the motion seeded feature (MSF) is returned as the final result.

A list N is defined to be a listing of candidate regions that must be tested for inclusion in X. The values of i and j are iterators over X and N, respectively. In the flow diagram of FIG. 4, instructions are defined as rectangular boxes containing the appropriate instruction, and diamond-shaped boxes are binary tests. If the case contained within the box is true, then the flow continues along the path labeled "true". Similarly, if the case contained within the box is false, then the flow continues along the path labeled "false". The instruction "++i" that appears on some pathways indicates incrementation; that is, take the current value of i (or j) and increase it by 1, for instance. For a list $X_j$, the ++j operation indicates that the next item in the list should be used.

Referring to FIG. 4, the system starts 400 with the MSR, which is the region in the image that contains the pixel with the highest motion score as determined by the MogS process. The MSR is defined as the first region in the object, X 402 and an iterator 'j' is set to one. Since 'j' starts at one and the length of X is one, then a first test element 404 is always true at the first iteration. The first test element 404 does not become important until the second iteration and afterward. As depicted, the term "length (.)" refers to the length of the list in the parentheses (the number of elements in it). Thus, length (X) indicates the number of elements in list X, and length (N) indicates the number of elements in list N.

The process is then used to find all regions adjacent to the MSR and put them in a list, N (instruction box 406). Starting with the first item in list N, the relative difference across the motion seeded feature (MSF) between the base region in X and the candidate region in N to be compared is computed in a second test element 408 as follows: $|N_{j,MSF} - X_{j,MSF}| < (X_{j,MSF} \alpha)$. In order to compute the relative difference, the absolute value of the difference between the MSF of a candidate watershed region N and any adjacent watershed region X that has already been determined to be part of the moving object is computed. If the absolute value is less than some predetermined fraction of the value of $X_j$MSF ($\alpha$, referred to as the acceptance threshold (reference element 128 in FIG. 1)), then the candidate watershed region is accepted as part of the object. If this is true, then the region in N is added to the end of the list X (instruction box 410), and the system then proceeds to the next element in list N++i 412, as long as the end of the N list has not been reached (a third test element 414). The process is continued, comparing the MSF for all regions in N against the first region in X, adding those regions that satisfy the second test element 408 to the end of list X. When the elements of N have been exhausted, the system moves to the next value in the list X (++j) 416 as long as the end of the list X is not reached as determined by the first test element 404.

Assuming that as least one of the regions in N satisfied the second test element 408, the list X now has more than one element in it. For the next element in X, the system finds all adjacent regions that are not already part of X (including those that were rejected by previous tests), creates a new listing N (instruction box 406), and cycles through the new list to find regions that can be added to X by satisfying the requirement in the second test element 408. This process is complete when all adjacent regions have been exhausted. That is, when all candidate regions in the list N for the last element in X are rejected by the second test element 408. At that time, the second test element 404 and the third test element 414 are both false, and the process progresses to "FINISH" 418.

Thus, the first test element 404 and the third test element 414 are parts of loops, and the second test element 408 is actually inside another loop (a loop within a loop). The first test element 404 is the control condition for a first loop 420, while the third test element 414 is the controller for the second loop 422. The search procedure is meticulous because the search may have to proceed through four or five layers of regions (or more) from the MSR to finally find the edge of the object.

At this point, the feature boundary has been clearly established and all similar watershed regions in the neighborhood have been joined together. The system applies inhibition of return to all annexed regions, computes the boundary and centroid of this region (feature boundary computation module 112 of FIG. 1), and continues to the next motion blob, which attaches to the new MSR. This process continues until all motion blobs in the current frame have been accounted for. Finally, referring to FIG. 1, after processing by each of the aforementioned modules of the system described herein, an output image 130 (e.g., frame) is generated for each frame in the video feed with a boundary 132 tightly drawn around the salient objects in the output image 130.

Figures 5A, 5B, 5C, 5D:
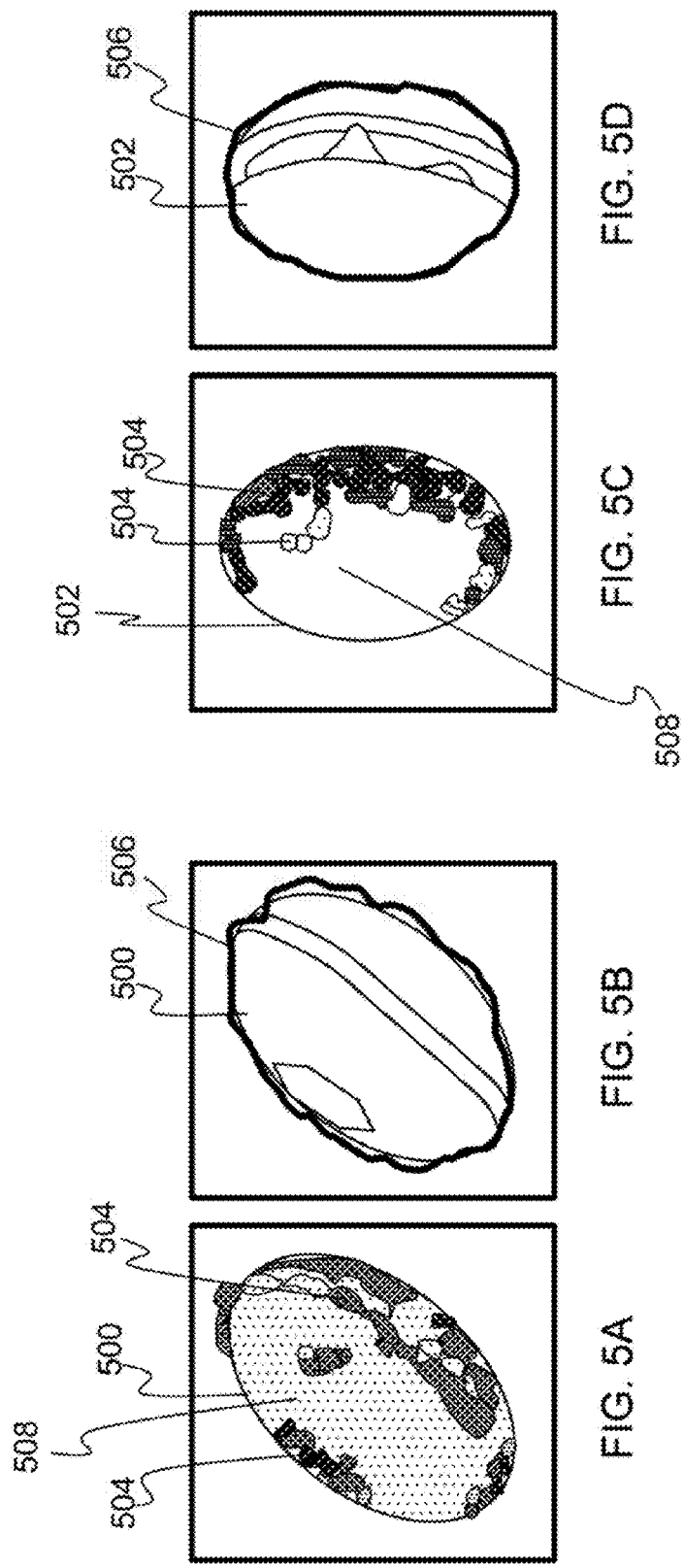
FIG. 5A illustrates an object broken down into multiple regions by the watershed process according to the present invention.
FIG. 5B illustrates the object of FIG. 5A after processing by the region growing process according to the present invention.
FIG. 5C illustrates an object broken down into multiple regions by the watershed process according to the present invention.
FIG. 5D illustrates the object of FIG. 5C after processing by the region growing process according to the present invention.

FIGS. 5A-5D depict region growing from watershed regions. FIGS. 5A and 5B illustrate the object being a yo-yo 500, and FIGS. 5C and 5D illustrate the object being a hamburger 502. Each object (500 and 502) is broken down into multiple regions 504 (as indicated by different shading) by the watershed process based on lighting shading, and other color differences, as shown in FIGS. 5A and 5C. The region growing process combines similar pieces along the MSF and represents them as a single object for segmentation, indicated by an object boundary 506 (bold outline), as shown in FIGS. 5B and 5D. The process functions regardless of the size of the object, as evidenced by the size differences between the objects in FIGS. 5A and 5B (i.e., yo-yo) and FIGS. 5C and 5D (i.e., hamburger).

Referring to FIG. 5A, the multiple regions 504 are watershed regions that must be combined (union) to form an object 500. In this case, if the MSR 508 is one region of the multiple regions 504, then one looks at each of the multiple regions 504 and tests them for similarity along the MSF. In this particular example, X would include all of the multiple regions 504. When the union operator is applied to list X, the final result is an object (500 in FIG. 5B, 502 in FIG. 5D) and the object boundary 506.

If the MSR is dramatically different from all neighboring watershed regions, then the second test element (depicted as 408 in FIG. 4) will fail and the MSR might be the only element in list X In this case, the "union" operator on this one region would return an identity, resulting in an object boundary that only surrounds the MSR and excluding all other watershed regions.

Figure 6:
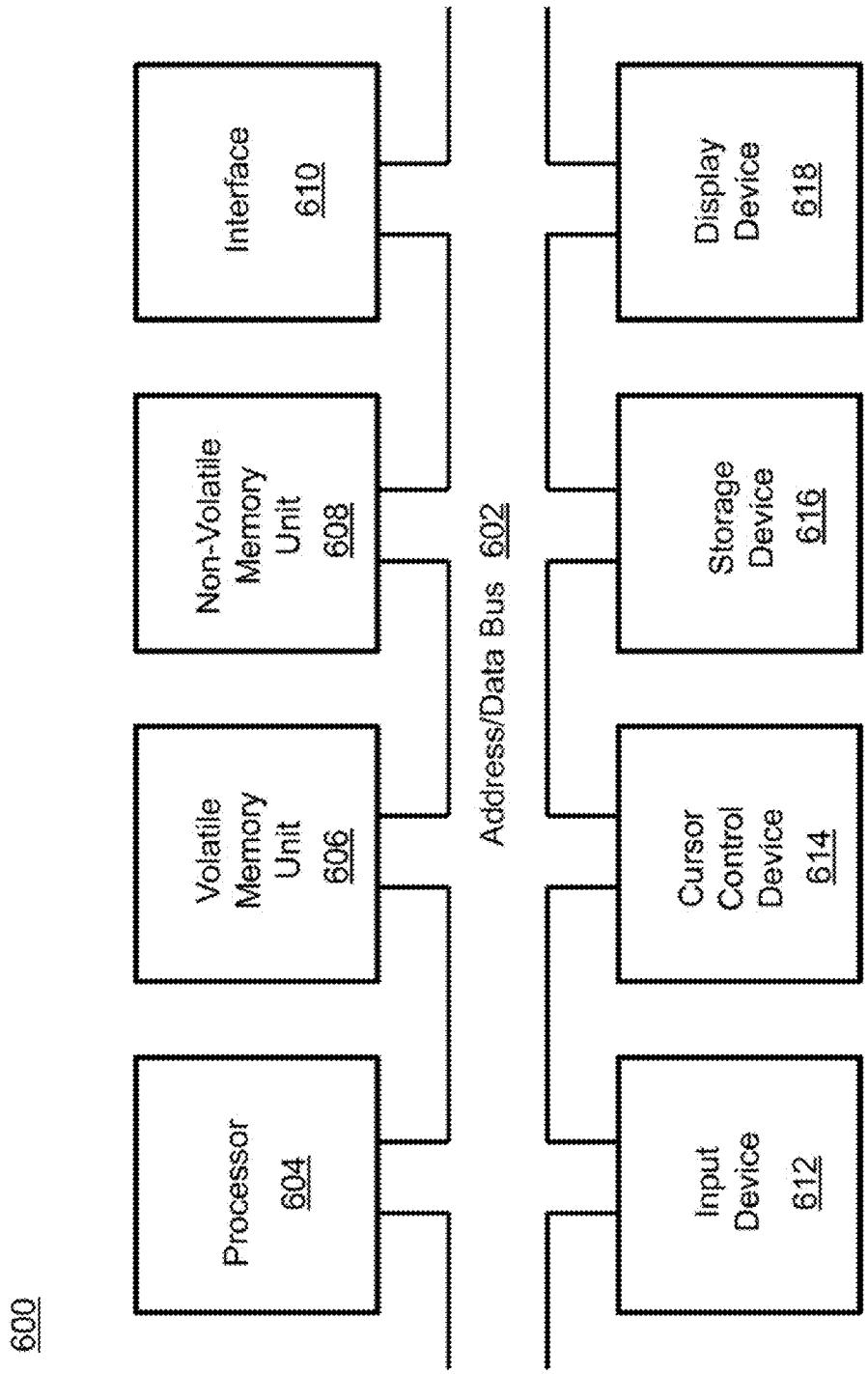
FIG. 6 is an illustration of a data processing system according to the present invention.

An example of a computer system 600 in accordance with one aspect is shown in FIG. 6. The computer system 600 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 600. When executed, the instructions cause the computer system 600 to perform specific actions and exhibit specific behavior, such as described herein.

The computer system 600 may include an address/data bus 602 that is configured to communicate information. Additionally, one or more data processing units, such as a processor 604, are coupled with the address/data bus 602. The processor 604 is configured to process information and instructions. In one aspect, the processor 604 is a microprocessor. Alternatively, the processor 604 may be a different type of processor such as a parallel processor, or a field programmable gate array.

The computer system 600 is configured to utilize one or more data storage units. The computer system 600 may include a volatile memory unit 606 (e.g., random access memory ("RAM"), static RAM, dynamic RAM, etc.) coupled with the address/data bus 602, wherein a volatile memory unit 606 is configured to store information and instructions for the processor 604. The computer system 600 further may include a non-volatile memory unit 608 (e.g., read-only memory ("ROM"), programmable ROM ("PROM"), erasable programmable ROM ("EPROM"), electrically erasable programmable ROM ("EEPROM"), flash memory, etc.) coupled with the address/data bus 602, wherein the non-volatile memory unit 608 is configured to store static information and instructions for the processor 604. Alternatively, the computer system 600 may execute instructions retrieved from an online data storage unit such as in "Cloud" computing. In one aspect, the computer system 600 also may include one or more interfaces, such as an interface 610, coupled with the address/data bus 602. The one or more interfaces are configured to enable the computer system 600 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 600 may include an input device 612 coupled with the address/data bus 602, wherein the input device 612 is configured to communicate information and command selections to the processor 600. In accordance with one aspect, the input device 612 is an alphanumeric input device, such as a keyboard, that may include alphanumeric and/or function keys. Alternatively, the input device 612 may be an input device other than an alphanumeric input device. In one aspect, the computer system 600 may include a cursor control device 614 coupled with the address/data bus 602, wherein the cursor control device 614 is configured to communicate user input information and/or command selections to the processor 600. In one aspect, the cursor control device 614 is implemented using a device such as a mouse, a track-ball, a track-pad, an optical tracking device, or a touch screen. The foregoing notwithstanding, in one aspect, the cursor control device 614 is directed and/or activated via input from the input device 612, such as in response to the use of special keys and key sequence commands associated with the input device 612. In an alternative aspect, the cursor control device 614 is configured to be directed or guided by voice commands.

In one aspect, the computer system 600 further may include one or more optional computer usable data storage devices, such as a storage device 616, coupled with the address/data bus 602. The storage device 616 is configured to store information and/or computer executable instructions. In one aspect, the storage device 616 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 618 is coupled with the address/data bus 602, wherein the display device 618 is configured to display video and/or graphics. In one aspect, the display device 618 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 600 presented herein is an example computing environment in accordance with one aspect. However, the non-limiting example of the computer system 600 is not strictly limited to being a computer system. For example, one aspect provides that the computer system 600 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, in one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 7:
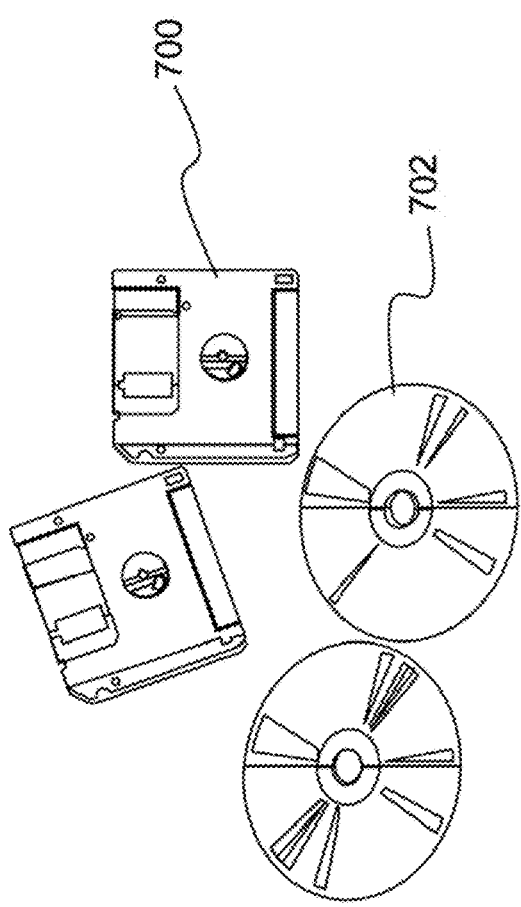
FIG. 7 is an illustration of a computer program product according to the present invention.

An illustrative diagram of a computer program product embodying the present invention is depicted in FIG. 7. As a non-limiting example, the computer program product is depicted as either a floppy disk 700 or an optical disk 702. However, as mentioned previously, the computer program product generally represents computer readable code (i.e., instruction means or instructions) stored on any compatible non-transitory computer readable medium.

The present invention combines advanced motion processing with biologically plausible feature extraction and segmentation of an attended object, making it possible to rapidly extract relevant or interesting parts of a scene for interpretation. Furthermore, the invention is purely software-based and modular, so the system can be used by itself as a stand-alone unit, or as a critical part of a larger object recognition and scene understanding mechanism. The system described herein can respond to a wide variety of segmentation challenges including color gradients due to lighting conditions and scale of segmentation, which makes it applicable to a much larger range of scenes than any prior art to date.

Further, the present invention is useful for any application that involves monitoring a scene for the purpose of finding interesting or unusual regions or occurrences. For example, it can be employed to search and rescue operations or in surveillance applications where any activity is an unexpected occurrence, such as in a desert, mountain range, or on the open sea. Furthermore, the system described herein can be used as a front-end for any application that employs visual object recognition and scene understanding to extract regions of interest for identification. Non-limiting examples of potential applications include automotive safety, factory safety and efficiency, autonomous systems, robotics, and intelligence analysis.

What is claimed is:

1. A system for object detection from dynamic visual imagery, the system comprising:
   one or more processors and a memory having instructions such that when the instructions are executed, the one or more processors perform operations of:
   receiving, as input, video imagery comprising a plurality of frames;
   processing each frame to detect at least one motion region exhibiting unexpected motion, wherein the at least one motion region represents a moving object in the video imagery;

applying object-based feature extraction to each frame containing a detected motion region;

dividing each frame containing a detected motion region into a plurality of feature-consistent regions;

identifying, in each frame containing a detected motion region, at least one motion seeded region (MSR) in the plurality of feature-consistent regions, wherein the MSR corresponds to a spatial location of the detected motion region in the frame;

joining a plurality of similar feature-consistent regions that are adjacent to and include the MSR to compute a boundary around the plurality of similar feature-consistent regions; and outputting, for each frame containing a detected motion region, a computed boundary surrounding an object in the detected motion region.

2. The system as set forth in claim 1, wherein the one or more processors further perform an operation of identifying a motion seeded feature (MSF) in each feature-consistent region, wherein the MSF is the feature that is consistent in the plurality of feature-consistent regions.

3. The system as set forth in claim 2, wherein the one or more processors further perform operations of:

defining a list X as a list of all detected motion regions;

defining the MSR as a first region in the list X for a first iteration;

defining a list N comprising all feature-consistent regions adjacent to the MSR;

computing a relative difference value across the MSF between the MSR in the list X and a candidate feature-consistent region in the list N;

wherein if the relative difference value is less than a predetermined threshold, then the candidate feature-consistent region is accepted as part of a detected motion region and added to the list X, and if the relative difference value is more than a predetermined threshold, then the candidate feature-consistent region is rejected.

4. The system as set forth in claim 3, wherein the one or more processors further perform an operation of computing, for a plurality of iterations, a relative difference value between each detection motion region in the list X and each feature-consistent region in the list N.

5. The system as set forth in claim 1, wherein the video imagery comprises red, green, and blue color channels, and wherein the one or more processors further perform operations of:

calculating intensity channels, comprising light intensity channels and dark intensity channels, from the video imagery by averaging the red, green, and blue color channels; and creating four fully-saturated color channels, comprising red, blue, green, and yellow color channels, that yield zero-response to white;

wherein effects of the color channels and the intensity channels are separated.

6. The system as set forth in claim 5, wherein the one or more processors further perform operations of:

computing a set of feature maps from the four fully-saturated color channels and the intensity channels;

computing gradient information for each feature map in the set of feature maps to generate a set of edge maps;

computing a master edge map comprising feature contour areas by combining the set of edge maps;

processing the master edge map to complete a boundary around the detected motion region and close the feature contour areas in the master edge map; and inputting the master edge map into a watershed process, wherein the watershed process converts the feature contour areas into the feature-consistent regions.

7. A computer-implemented method for object detection from dynamic visual imagery, comprising an act of causing a data processor to execute instructions stored on a non-transitory memory such that upon execution, the data processor performs operations of:

receiving, as input, video imagery comprising a plurality of frames;

processing each frame to detect at least one motion region exhibiting unexpected motion, wherein the at least one motion region represents a moving object in the video imagery;

applying object-based feature extraction to each frame containing a detected motion region;

dividing each frame containing a detected motion region into a plurality of feature-consistent regions;

identifying, in each frame containing a detected motion region, at least one motion seeded region (MSR) in the plurality of feature-consistent regions, wherein the MSR corresponds to a spatial location of the detected motion region in the frame;

joining a plurality of similar feature-consistent regions that are adjacent to and include the MSR to compute a boundary around the plurality of similar feature-consistent regions; and outputting, for each frame containing a detected motion region, a computed boundary surrounding an object in the detected motion region.

8. The method as set forth in claim 7, further comprising an act of causing a data processor to perform an operation of identifying a motion seeded feature (MSF) in each feature-consistent region, wherein the MSF is the feature that is consistent in the plurality of feature-consistent regions.

9. The method as set forth in claim 8, further comprising an act of causing a data processor to perform operations of:

defining a list X as a list of all detected motion regions;

defining the MSR as a first region in the list X for a first iteration;

defining a list N comprising all feature-consistent regions adjacent to the MSR;

computing a relative difference value across the MSF between the MSR in the list X and a candidate feature-consistent region in the list N;

wherein if the relative difference value is less than a predetermined threshold, then the candidate feature-consistent region is accepted as part of a detected motion region and added to the list X, and if the relative difference value is more than a predetermined threshold, then the candidate feature-consistent region is rejected.

10. The method as set forth in claim 9, further comprising an act of causing a data processor to perform an operation of computing, for a plurality of iterations, a relative difference value between each detection motion region in the list X and each feature-consistent region in the list N.

11. The method as set forth in claim 7, further comprising an act of causing a data processor to perform operations of:

calculating intensity channels, comprising light intensity channels and dark intensity channels, from the video imagery by averaging the red, green, and blue color channels; and creating four fully-saturated color channels, comprising red, blue, green, and yellow color channels, that yield zero-response to white;

wherein effects of the color channels and the intensity channels are separated.

12. The method as set forth in claim 11, further comprising an act of causing a data processor to perform operations of:
- computing a set of feature maps from the four fully-saturated color channels and the intensity channels;
- computing gradient information for each feature map in the set of feature maps to generate a set of edge maps;
- computing a master edge map comprising feature contour areas by combining the set of edge maps;
- processing the master edge map to complete a boundary around the detected motion region and close the feature contour areas in the master edge map; and
- inputting the master edge map into a watershed process, wherein the watershed process converts the feature contour areas into the feature-consistent regions.

13. A computer program product for object detection from dynamic visual imagery, the computer program product comprising:
- computer-readable instructions stored on a non-transitory computer-readable medium that are executable by a computer having a processor for causing the processor to perform operations of:
  - receiving, as input, video imagery comprising a plurality of frames; processing each frame to detect at least one motion region exhibiting unexpected motion, wherein the at least one motion region represents a moving object in the video imagery;
  - applying object-based feature extraction to each frame containing a detected motion region;
  - dividing each frame containing a detected motion region into a plurality of feature-consistent regions;
  - identifying, in each frame containing a detected motion region, at least one motion seeded region (MSR) in the plurality of feature-consistent regions, wherein the MSR corresponds to a spatial location of the detected motion region in the frame;
  - joining a plurality of similar feature-consistent regions that are adjacent to and include the MSR to compute a boundary around the plurality of similar feature-consistent regions; and
  - outputting, for each frame containing a detected motion region, a computed boundary surrounding an object in the detected motion region.

14. The computer program product as set forth in claim 13, further comprising instructions for causing a processor to perform an operation of identifying a motion seeded feature (MSF) in each feature-consistent region, wherein the MSF is the feature that is consistent in the plurality of feature-consistent regions.

15. The computer program product as set forth in claim 14, further comprising instructions for causing a processor to perform operations of:
- defining a list X as a list of all detected motion regions;
- defining the MSR as a first region in the list X for a first iteration;
- defining a list N comprising all feature-consistent regions adjacent to the MSR;
- computing a relative difference value across the MSF between the MSR in the list X and a candidate feature-consistent region in the list N;
- wherein if the relative difference value is less than a predetermined threshold, then the candidate feature-consistent region is accepted as part of a detected motion region and added to the list X, and if the relative difference value is more than a predetermined threshold, then the candidate feature-consistent region is rejected.

16. The computer program product as set forth in claim 15, further comprising instructions for causing a processor to perform an operation of computing, for a plurality of iterations, a relative difference value between each detection motion region in the list X and each feature-consistent region in the list N.

17. The computer program product as set forth in claim 13, further comprising instructions for causing a processor to perform operations of:
- calculating intensity channels, comprising light intensity channels and dark intensity channels, from the video imagery by averaging the red, green, and blue color channels; and
- creating four fully-saturated color channels, comprising red, blue, green, and yellow color channels, that yield zero-response to white;
  - wherein effects of the color channels and the intensity channels are separated.

18. The computer program product as set forth in claim 17, further comprising instructions for causing a processor to perform operations of:
- computing a set of feature maps from the four fully-saturated color channels and the intensity channels;
- computing gradient information for each feature map in the set of feature maps to generate a set of edge maps;
- computing a master edge map comprising feature contour areas by combining the set of edge maps;
- processing the master edge map to complete a boundary around the detected motion region and close the feature contour areas in the master edge map; and
- inputting the master edge map into a watershed process, wherein the watershed process converts the feature contour areas into the feature-consistent regions.

* * * * *